United States Patent
Sato (10) Patent No.: US 9,137,399 B2
(45) Date of Patent: Sep. 15, 2015

(54) IMAGE PROCESSING APPARATUS AND METHOD OF CONTROLLING SAME

(75) Inventor: Tomoya Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 12/915,294

(22) Filed: Oct. 29, 2010

(65) Prior Publication Data

US 2011/0145371 A1   Jun. 16, 2011

(30) Foreign Application Priority Data

Dec. 16, 2009 (JP) ................. 2009-285743

(51) Int. Cl.
*H04N 1/00* (2006.01)
*G06F 3/12* (2006.01)

(52) U.S. Cl.
CPC ......... *H04N 1/00464* (2013.01); *H04N 1/0049* (2013.01); *H04N 1/00204* (2013.01); *H04N 1/00244* (2013.01); *H04N 1/00411* (2013.01); *H04N 1/00413* (2013.01); *H04N 1/00474* (2013.01); *H04N 1/00482* (2013.01); *H04N 1/00973* (2013.01); *G06F 3/1204* (2013.01); *G06F 3/1205* (2013.01); *G06F 3/1253* (2013.01); *G06F 3/1271* (2013.01); *G06F 3/1286* (2013.01); *G06F 3/1287* (2013.01); *H04N 1/00387* (2013.01); *H04N 2201/0039* (2013.01); *H04N 2201/0094* (2013.01)

(58) Field of Classification Search
CPC ................. H04N 2201/0094; H04N 1/00244; H04N 2201/3249; H04L 67/00; H04L 67/02
USPC ......... 709/223, 224, 203, 217, 219; 358/1.12, 358/1.14, 1.15, 400, 405, 407
See application file for complete search history.

(56) References Cited

U.S. PATENT DOCUMENTS

| | | | |
|---|---|---|---|
| 6,930,792 B2 * | 8/2005 | Cannon et al. | 358/1.15 |
| 7,265,859 B2 * | 9/2007 | Sato | 358/1.15 |
| 7,561,286 B2 * | 7/2009 | Suto | 358/1.14 |
| 8,120,793 B2 * | 2/2012 | Lovat et al. | 358/1.14 |
| 8,154,760 B2 * | 4/2012 | Satoh | 358/1.4 |
| 2001/0054086 A1 * | 12/2001 | Miyahira | 709/218 |
| 2003/0051215 A1 * | 3/2003 | Nakao | 715/513 |
| 2005/0099650 A1 * | 5/2005 | Brown et al. | 358/1.15 |

(Continued)

FOREIGN PATENT DOCUMENTS

JP   2006-127503   5/2006

*Primary Examiner* — LaShonda Jacobs
(74) *Attorney, Agent, or Firm* — Fitzpatrick, Cella, Harper & Scinto (57) ABSTRACT

An image processing apparatus communicates with a web server. The apparatus includes an operation unit having a predetermined key for starting a scanning process and a display unit. A scanning unit executes scanning of an original document in response to detection of depression of the predetermined key. A display control unit controls the display unit to display a web page containing a scan inputting a scan setting. A transmitting unit transmits scan setting information, based on detection of depression of the predetermined key or the transmitting item while the web page is displayed. A reception unit receives an instruction from the web server, the instruction instructing an execution of the scanning process of an original document and being based on the scan setting information transmitted by the transmitting unit. The scanning unit executes the scanning process in accordance with the instruction received by the reception unit.

9 Claims, 10 Drawing Sheets

(56) References Cited

U.S. PATENT DOCUMENTS

| | | | |
|---|---|---|---|
| 2006/0028675 A1* | 2/2006 | Watanabe et al. | 358/1.15 |
| 2006/0059462 A1* | 3/2006 | Yamamoto | 717/115 |
| 2006/0077423 A1* | 4/2006 | Mathieson et al. | 358/1.15 |
| 2008/0016210 A1* | 1/2008 | Maekawa et al. | 709/224 |
| 2009/0161132 A1* | 6/2009 | Sato | 358/1.9 |
| 2009/0268229 A1* | 10/2009 | Richardson et al. | 358/1.15 |
| 2009/0296133 A1* | 12/2009 | Kawabushi et al. | 358/1.15 |
| 2010/0046038 A1* | 2/2010 | Matsuda et al. | 358/434 |
| 2010/0053676 A1* | 3/2010 | Sugimoto | 358/1.15 |
| 2010/0149592 A1* | 6/2010 | Yoshida | 358/1.15 |
| 2011/0125899 A1* | 5/2011 | Yamamoto | 709/225 |
| 2011/0191431 A1* | 8/2011 | Noguchi | 709/206 |

* cited by examiner

```
<html>
  <head>
    <title>SCAN AND TRANSMIT</title>
  </head>
  <body>
    PLACE DOCUMENT ON DOCUMENT PLATEN AND PRESS START KEY
    <from action="./start" method="post" ><br/>                          601
    RESOLUTION:
    <select name="resolution">                                           602
      <option value="0" >100 × 100dpi </option >
      <option value="1" >200 × 200dpi </option >
      <option value="2" >300 × 300dpi </option >
      <option value="3" >600 × 600dpi </option >
    </select >
    <br/>
    <input type="checkbox" "name="color"value="1"/>READ IN FULL COLOR<br/><br/>   603
    <input type="reset"value="RESET"/>                                              604
    <input type="submit"value="START (START ALSO POSSIBLE USING START KEY)"/><br/>  605
    </form >
  </body>
</html>
```

```
<html>
  <head>
    <title>SCAN AND TRANSMIT</title>
  </head>
  <body>
    PLACE DOCUMENT ON DOCUMENT PLATEN AND PRESS START KEY
    <from action="start" method="post" ><br/>         801
    RESOLUTION:
      <select name="resolution" >                    802
        <option value="0" >100 × 100dpi </option>
        <option value="1" >200 × 200dpi </option>
        <option value="2" >300 × 300dpi </option>
        <option value="3" >600 × 600dpi </option>
      </select>
      <br/><br/>
      <input type="submit"value="TRANSMIT IN COLOR"name="color"/>     803
      <input type="submit"value="TRANSMIT IN MONOCHROME"name="bw"/><br/>    804
    </form>
  </body>
</html>
```

IMAGE PROCESSING APPARATUS AND METHOD OF CONTROLLING SAME

BACKGROUND OF THE INVENTION

1. Field of the Invention

The present invention relates to an image processing apparatus, and to a method of controlling the apparatus, in which an operation can be designated using a hard key on a console unit while the screen of a web browser is being displayed on the console unit.

2. Description of the Related Art

In the prior art, an information processing apparatus such as a personal computer is connected to a web server on a network, and an operation screen provided by the web server is displayed by a web browser with which the information processing apparatus is equipped. In this case, the web browser of the information processing apparatus requests the web server for the operation screen, and a web application of the web server responds to the request from the information processing apparatus by transmitting content, which is for causing the web browser to display the operation screen, to the information processing apparatus. The content is composed of an HTML file, an image file, a script file and the like. As a result, the web browser of the information processing apparatus analyzes the received content and displays the operation screen that is based upon the descriptions in the content. If a user inputs a command via the operation screen displayed by the web browser, the web browser notifies the web server of the command. The web application of the web server so notified then executes processing in accordance with the command that has been input.

Multifunction peripherals (MFPs) equipped with a scanner and printer have recently come to include those equipped with a web browser of the kind described above. For example, the specification of Japanese Patent Laid-Open No. 2006-127503 discloses art in which a web server provides an operation screen for utilizing various functions possessed by an MFP. In accordance with such prior art, the user of the MFP inputs a command with regard to the MFP via the operation screen displayed on the web browser. The web server is notified of the entered command via the web browser of the MFP and the web server so notified requests the MFP to execute various processing in accordance with the contents of the command. The MFP so requested executes the requested processing. As a result, all menu data for operating the MFP need no longer be held in the MFP, and the menu data can be changed easily at the web server.

It is preferred that an MFP of the above-described kind that displays an operation screen acquired from a web server on a web browser be capable of providing operability the same as that of an ordinary MFP. In particular, since an operation that instructs an MFP to start processing is one used most often by a user, it is preferred that this method of instruction be made the same as that of an ordinary MFP. Generally, an MFP is equipped with a hard key (a start key) for instructing the start of processing, and the operation for starting processing such as reading or printing of a document is performed by pressing this start key. Accordingly, in an MFP of the kind illustrated in Japanese Patent Laid-Open No. 2006-127503 that displays an operation screen provided by a web server on the web browser of the MFP and that accepts various commands from the user, it is preferred from the standpoint of operability that the operation for starting processing be performed by pressing a start key.

Among the types of information processing apparatus such as the above-described MFP, there is an information processing apparatus in which a web server provides the screens of some applications and another application reads out and executes a program being held within the MFP. Here an application provided by a web server is referred to as a "web application", and an application executed based upon information already held in an MFP is referred to as a "native application". For example, there is an MFP in which a copy function is provided as a native application and a scan function is provided as a web application. In such an MFP, the user may be confused if there is a difference in operability between the web application and the native application. With a web application, however, it is not possible to accept an operation command based upon use of a hard key provided on the MRP.

In order to instruct the start of processing with a web application, it is required that an HTML form containing information entered by the user be submitted to the web application. However, a button for instructing such submission is displayed on the operation screen as a soft key in accordance with the description of the content, and a form cannot be submitted by a hard key provided on the MFP.

On the other hand, web browsers operated by a personal computer include one in which focus is moved by pressing a tab key provided on the personal computer and a return key is pressed in a state in which the focus is situated on a submit button, there enabling transmission (submission) of the contents set forth in a form. Even if such an operation is applied to the web browser of an MFP, an operation is required that entails pressing a start key after the focus is moved. Since such an operation differs from the operation method employed in an ordinary MFP, the user can become confused.

SUMMARY OF THE INVENTION

An aspect of the present invention is to eliminate the above-mentioned problems with the conventional technology.

The present invention provides a technique whereby an operation of accepting various commands from a user in a state in which an operation screen provided by a web server is being displayed on a web browser can be performed by pressing a start key that is a hard key.

According to an aspect of the present invention, there is provided an image processing apparatus, having a web browser for displaying an operation screen provided by a web server, the apparatus comprising: an analysis unit configured to analyze content that displays the operation screen acquired from the web server; a display unit configured to display the operation screen based upon analysis by the analysis unit; a start key being a hard key configured to instruct start of image processing; a determination unit configured to determine, based upon the analysis by the analysis unit, whether the content includes a description instructing that form data is transmitted to the web server; and a send control unit configured to exercise control in such a manner that the form data is transmitted to the web server in response to pressing of the start key if it is determined by the determination unit that the content includes a description instructing that the form data is transmitted to the web server.

According to another aspect of the present invention, there is provided a method of controlling an image processing apparatus having a web browser for displaying an operation screen provided by a web server, the method comprising: analyzing content that displays the operation screen acquired from the web server; displaying the operation screen based upon analysis in the analyzing step; determining, based upon the analysis in the analyzing step, whether the content includes a description instructing that form data is transmitted to the web server; and exercising control in such a manner that the form data is transmitted to the web server in response to pressing of a start key being a hard key for instructing start of image processing if it is determined in the determining step that the content includes a description instructing that the form data be transmitted to the web server.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

A first embodiment of the present invention will be described first. In the first embodiment, an example will be described in which, if a form exists in content that an MFP 101 according to the first embodiment has acquired from a web server 102, then the form is transmitted to the web server by pressing a start key on the console unit of the MFP 101.

Figure 1:
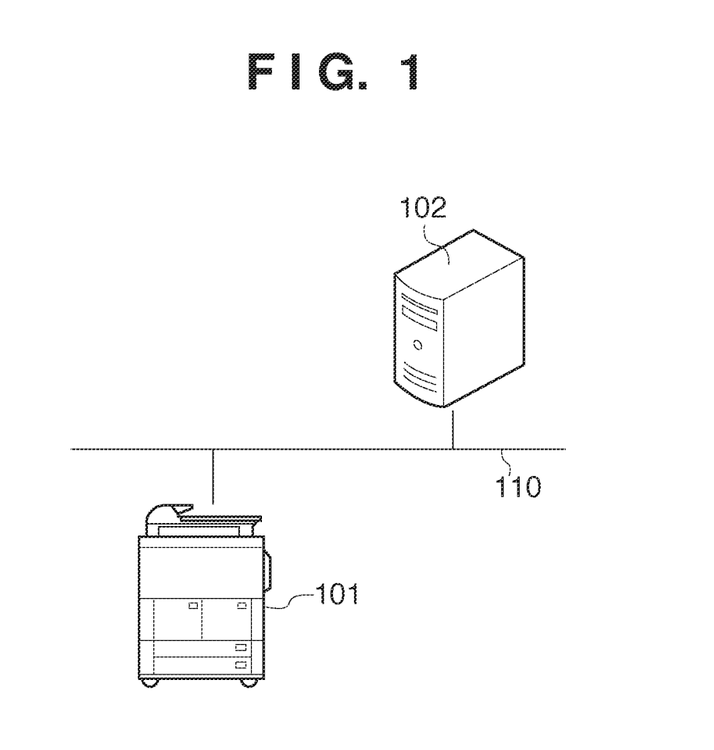
FIG. 1 is a diagram illustrating the configuration of a system that includes an image processing apparatus according to a first embodiment of the present invention.

FIG. 1 is a diagram illustrating the configuration of a system that includes an image processing apparatus (an MFP) according to a first embodiment of the present invention.

The MFP 101 and web server 102 are connected to a LAN 110 so as to be capable of communicating with each other. Although only one MFP and one server are illustrated in FIG. 1, a plurality of personal computers, MFPs and servers, etc., may just as well be connected to the LAN 110.

Figure 2A:
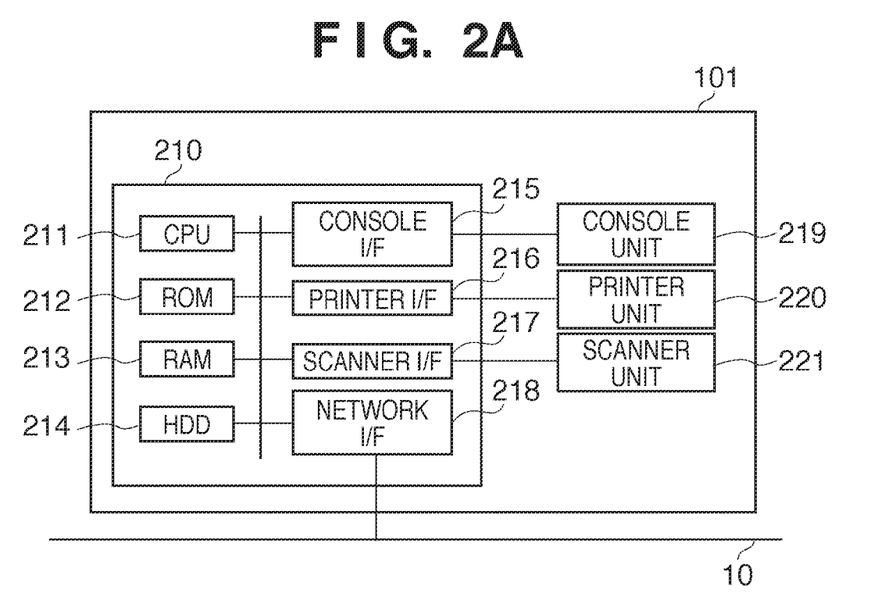
FIG. 2A is a block diagram illustrating the configuration of an MFP according to a first embodiment.

FIG. 2A is a block diagram illustrating the configuration of the MFP 101 according to the first embodiment.

A controller 210 that includes a CPU 211 controls the operation of the overall MFP 101. The CPU 211 reads out a control program that has been stored in a ROM 212 and executes various control processing such as processing for controlling read and transmit. A RAM 213 is used as a temporary storage area such as the main memory and work area of the CPU 211. A hard-disk drive (HDD) 214 stores image data and various programs or various information tables and the like. A console interface (I/F) 215 controls interfacing between a console unit 219 and the controller 210. The console unit 219 is equipped with a liquid crystal display having a touch-sensitive panel function and with a keyboard, etc. The MFP 101 is further equipped with a web browser function, described later. The web browser of MFP 101 analyzes an HTML file received from the web server 102 and displays an operation screen, which is based upon the description in this HTML file, on a display unit of the console unit 219. The details of the console unit 219 will be described later.

A printer interface (I/F) 216 connects a printer unit 220 and the controller 210. Image data to be printed by the printer unit 220 is transferred from the controller 210 to the printer unit 220 via the printer I/F 216 and is printed on a print medium (sheet) in the printer unit 220. A scanner interface (I/F) 217 connects a scanner unit 221 and the controller 210. The scanner unit 221 reads the image of an original, generates image data and supplies the image data to the controller 210 via the scanner I/F 217. A network interface (I/F) 218 connects the controller 210 to a LAN 110. The network I/F 218 transmits image data and information to an external apparatus (web server 102, for example) on the LAN 110 and receives various information from the external apparatus on the LAN 110.

Figure 2B:
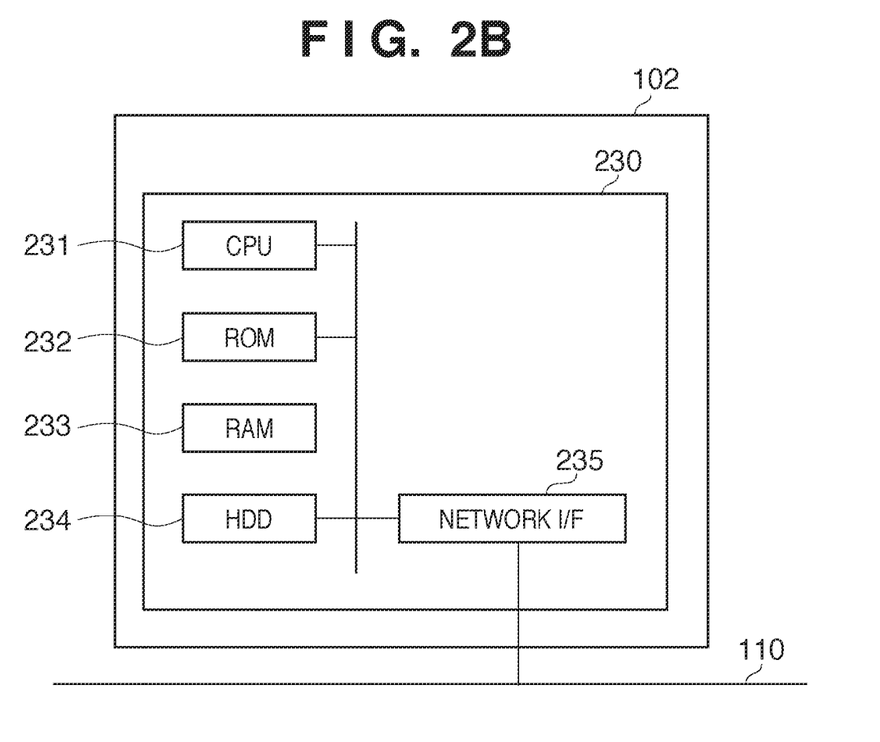
FIG. 2B is a block diagram illustrating the configuration of a web server according to the first embodiment.

FIG. 2B is a block diagram illustrating the configuration of the web server 102 according to the first embodiment.

A controller 230 that includes a CPU 231 controls the operation of the overall web server 102. The CPU 231 executes various control processing by executing a program that has been loaded into a RAM 233 from a hard-disk drive (HDD) 234. A ROM 232 stores a boot program and various data. The RAM 233 is used as a temporary storage area such as the main memory and work area of the CPU 231. The HDD 234 stores image data and various programs or various information tables. A network I/F 235 connects the controller 230 to the LAN 110. The network I/F 235 sends and receives various information to and from other devices on the LAN 110.

Figure 3:
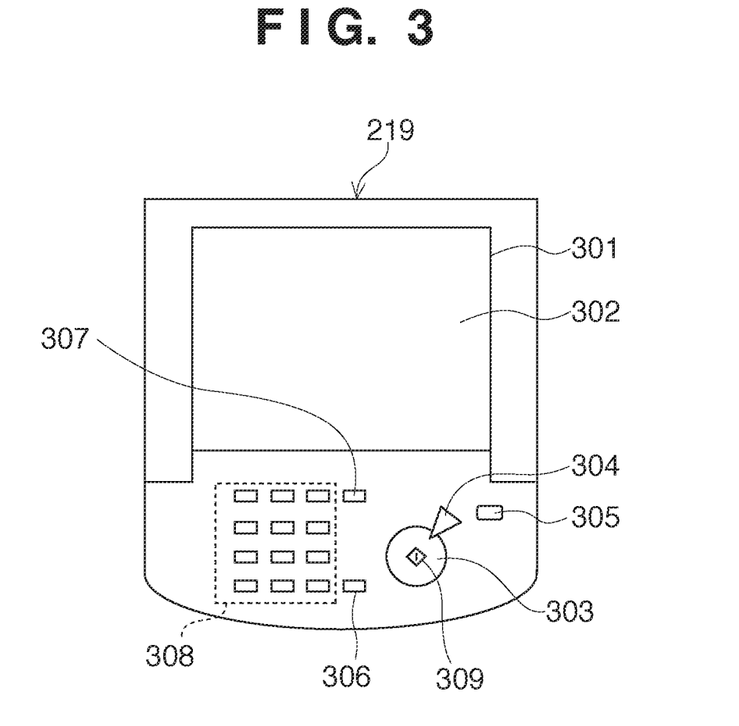
FIG. 3 depicts an external view illustrating the configuration of a console unit of an MFP according to the first embodiment.

Next, the configuration of the console unit 219 of MFP 101 will be described with reference to FIG. 3, which depicts an external view illustrating the configuration of the console unit 219 of the MFP 101 according to the first embodiment.

The console unit 219 has an LCD display unit 301 comprising an LCD and a touch-panel sheet 302 affixed to the LCD. An operation screen and soft keys displayed by a native function module or web browser (described later) are displayed on the LCD display unit 301. When a displayed key is pressed, position information indicating the position pressed is transmitted from the LCD display unit 301 to the CPU 211. The console unit 219 is further provided with various hard keys, namely a start key 303, a stop key 304, a reset key 305, a guide key 306, a top menu key 307 and numeric keys 308. The start key 303 is a hard key for instructing the MFP 101 to start processing. Provided at the center of the start key 303 is a two-color (green and red) LED display 309. The two-color LED display 309 indicates by its color whether or not the start key 303 is in a usable state. The stop key 304 is a key for stopping operation that is in progress. The reset key 305 is a key used when initializing a setting. The guide key 306 is a key for displaying methods of using the MFP 101. The top menu key 307 is a key for displaying a top menu screen for selecting the function of the MFP 101. The numeric keys 308 are for inputting numerical values.

Figure 4:
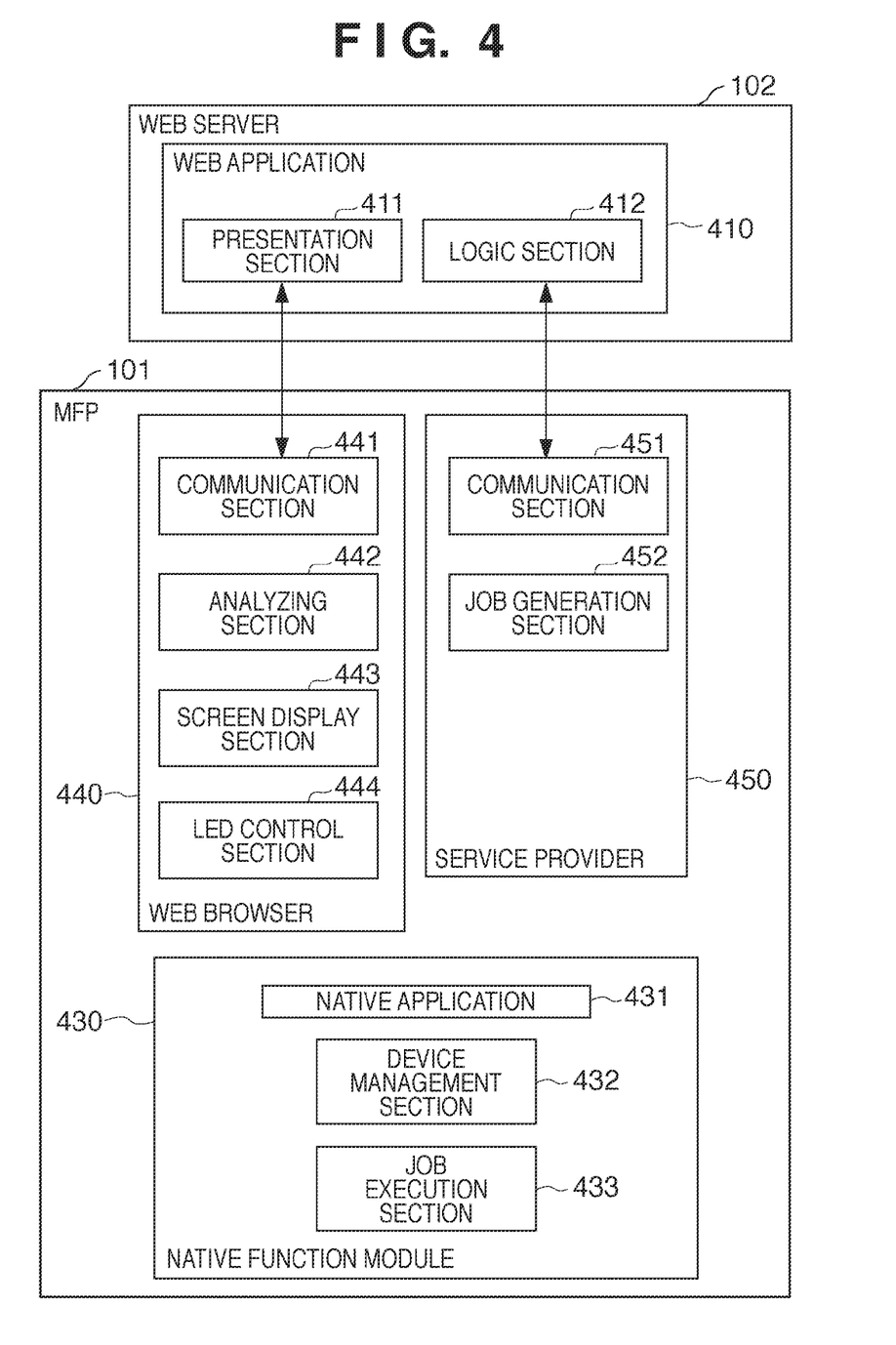
FIG. 4 is a diagram useful in describing the software configuration of the overall system according to the first embodiment.

FIG. 4 is a diagram useful in describing the software configuration of the overall system according to the first embodiment. The functional units shown in FIG. 4 are implemented by having the CPUs 211 and 231, which are provided in the MFP 101 and web server 102, respectively, execute the corresponding control programs.

The MFP 101 has a native function module 430, which executes functions already possessed by the MFP 101, a web browser 440 and a service provider 450. The web browser 440 includes a communication section 441, an analyzing section 442, a screen display section 443 and a LED control section 444. The communication section 441 communicates with a presentation section 411 of a web application 410 of the web server 102 in accordance with the HTTP protocol. More specifically, the communication section 441 requests the web application 410 for the content of the operation screen that will be displayed by the web browser 440 and receives the content from the web server 102. The communication section 441 further notifies the web application 410 of a user command entered via the operation screen displayed by the web browser 440. The analyzing section 442 analyzes the content of the operation screen received from the web application 410. This content includes an HTML file, an image file, a script file and the like. These files contain descriptions indicating the contents of the operation screen received from the web application 410. The screen display section 443 displays the operation screen on the LCD display unit 301 of console unit 219 based upon the result of analysis by the analyzing section 442. On the basis of the result of analysis by the analyzing section 442, the LED control section 444 determines whether a form submit element is contained in the HTML file received from the web application 410 and controls the light emission of the two-color LED display 309 at the center of the start key 303.

The service provider 450 includes a communication section 451 and a job generation section 452. The communication section 451 accepts a processing request from a logic section 412 of web application 410. If execution of processing is requested from the web application 410, the job generation section 452 generates a job for executing the requested processing.

The native function module 430 includes native applications 431, a device management section 432 and a job execution section 433. The native applications 431 are various applications provided based upon programs already being held by the MFP 101; they are not provided by the web server 102. For example, the native applications 431 include applications for executing print processing by the printer unit 220 of MFP 101 and for executing read processing by the scanner unit 221 of MFP 101. The job execution section 433 executes jobs generated by the native applications 431 and by the job generation section 452 of service provider 450. The device management section 432 manages the error status of each module of MFP 101 and, if an error occurs, notifies the web browser 440 or service provider 450 of information indicative of the error. The device management section 432 further executes processing for setting the overall MFP 101 and for changing over applications.

The web server 102 has the web application 410. The web application 410 includes the presentation section 411 and logic section 412.

The presentation section 411 communicates with the communication section 441 of MFP 101 and, in response to a request from the MFP 101, sends the MFP 101 the content of an operation screen to be displayed by the web browser 440 of MFP 101. Further, the presentation section 411 accepts from the MFP 101 a user command that has been entered via the operation screen displayed on the web browser 440 of MFP 101. Upon receiving the command from the user, the web application 410 executes various processing in accordance with the contents of the command. Further, in response to the contents of the command from the web browser 440, the web application 410 requests the MFP 101 to execute processing. Specifically, the web application 410 requests execution of print processing by the printer unit 220 of MFP 101, execution of document-read processing by the scanner unit 221 of MFP 101 or execution of transmit processing via the network interface I/F 218. In a case where the web server 102 thus requests the MFP 101 to execute processing, the logic section 412 requests job generation of the job generation section 452 via the communication section 451 of service provider 450 provided in the MFP 101. Assume here that the web application 410 is an application for scanning in a document that has been placed on a document platen and for transmitting the document to a specific FTP server on network 110 using the FTP protocol.

Figure 5:
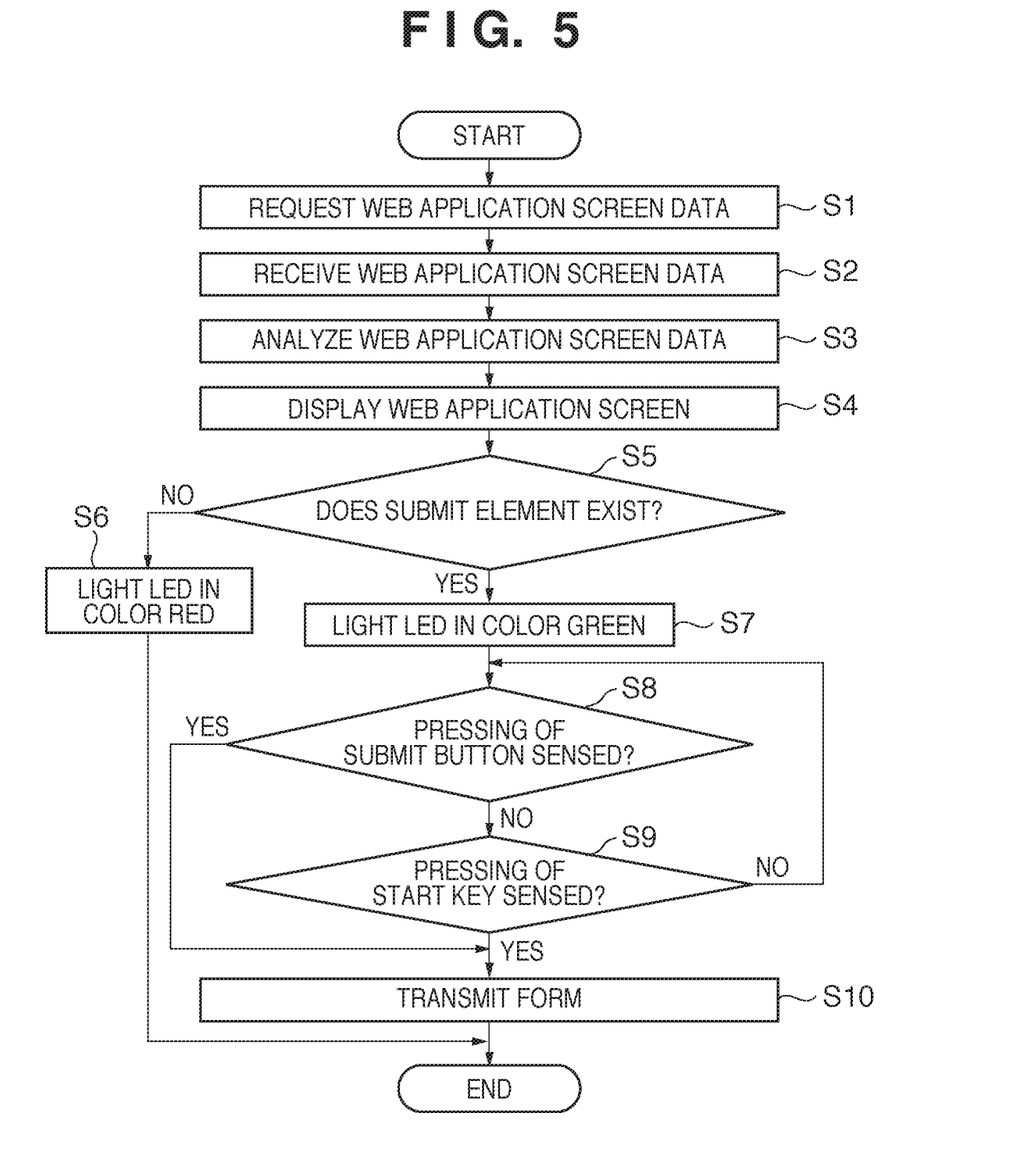
FIG. 5 is a flowchart for describing control processing executed by an MFP according to the first embodiment.

FIG. 5 is a flowchart for describing control processing executed by the MFP 101 according to the first embodiment. Here reference will be had to the flowchart to describe a series of operations performed by the web browser 440 in a case where the MFP 101 acquires and displays an operation screen from the web application 410, reads in a document in response to the user pressing the start key 303 and transmits the read document to a specific FTP server. It should be noted that each operation indicated in the flowchart is executed as a result of the CPU 211 of MFP 101 running a control program.

First, in step S1, the web server 102 is requested for the operation screen of web application 410 by the web browser 440, which operation screen will be displayed on the web browser 440 of MFP 101. Specifically, the MFP 101 communicates with the URL of the web application 410 in accordance with the HTTP protocol. This URL may be an URL set previously as the home page, etc., of the web browser 440, or an URL that the user has input to an URL input field of the web browser 440. Alternatively, the URL may be that of a link that the user has selected on the screen being displayed by the web browser 440. Next, in step S2, screen data, which is the response from the web application 410, is received. As mentioned above, the screen data is composed of an HTML file, an image file and a script file, etc. Next, in step S3, the web application screen data received in step S2 is analyzed. As the result of analysis, whether or not the application screen data includes a form submit element is stored in RAM 213 or the like in step S3. Next, in step S4, the web application screen is displayed on the LCD display unit 301 of console unit 219 based upon the result of analysis in step S3.

Figure 6A:
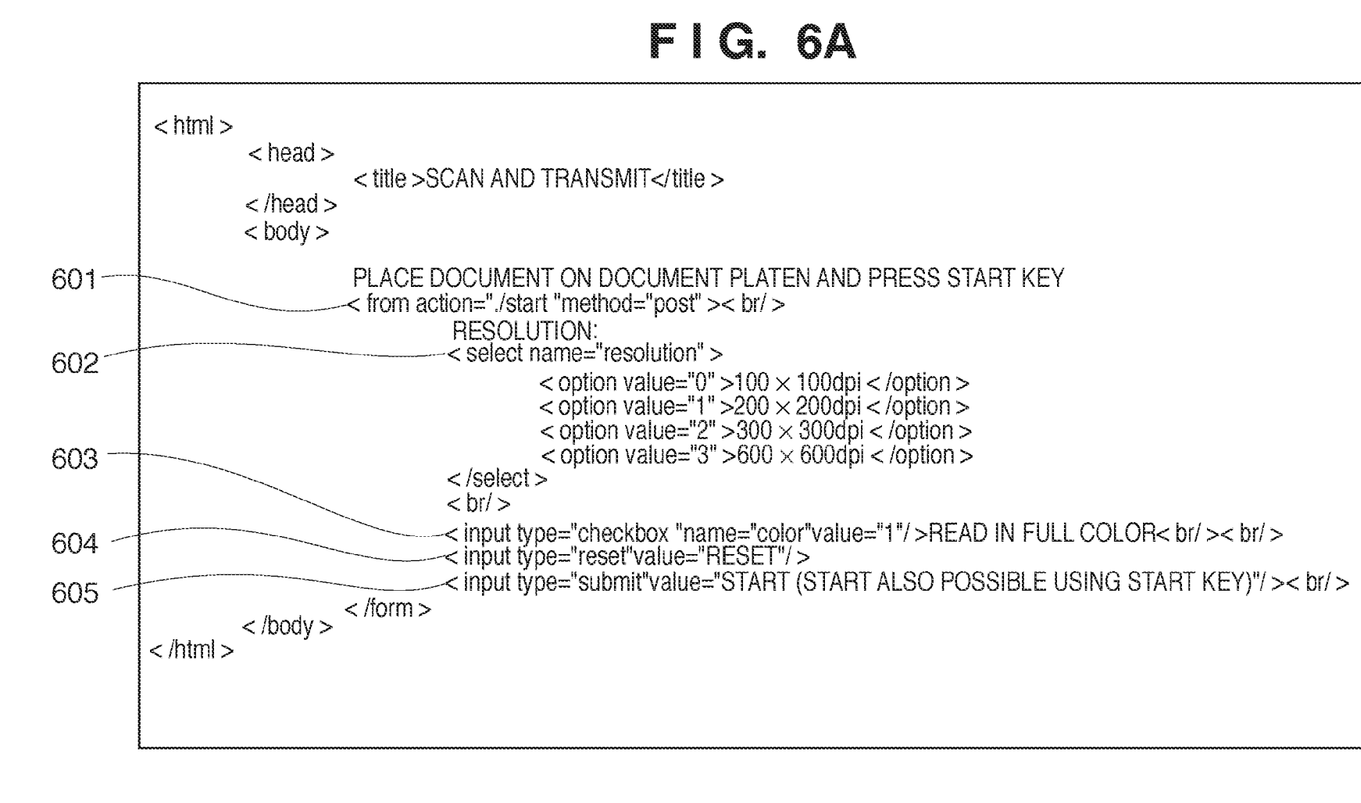
FIG. 6A is a diagram illustrating an example of web application screen data received in step S2 in FIG. 5.
Figure 6B:
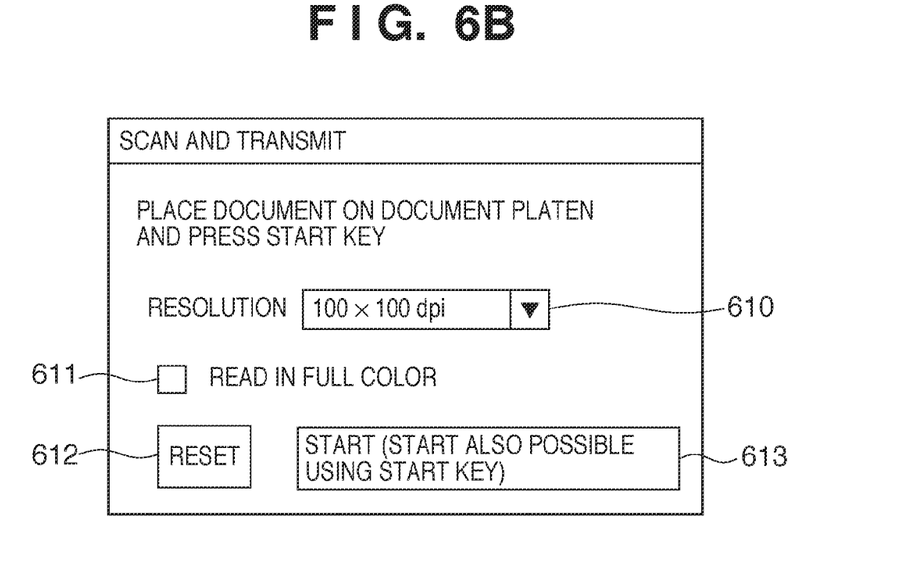
FIG. 6B is a diagram illustrating an example of a screen displayed in step S4 in FIG. 5 in a case where the screen data shown in FIG. 6A has been received.

FIG. 6A is a diagram illustrating an example of web application screen data received in step S2 in FIG. 5, and FIG. 6B is a diagram illustrating an example of a screen displayed on the LCD display unit 301 in step S4 in FIG. 5 in a case where the screen data shown in FIG. 6A has been received.

In FIG. 6A, a start tag 601 of a form indicates that the form will be transmitted in response to "./start" by the POST method in a case where a submit command is issued by an action attribute and a method attribute. A select element 602 is for designating resolution at which reading is performed. Upon receiving this screen data, the web browser 440 renders these resolutions in the form of a pull-down menu shown at 610 in FIG. 6B and makes it possible for the user to select a resolution. A check box element 603 is for designating whether a document should be read in full color. In accordance with this element 603, the web browser 440 renders a check box of the kind indicated at 611 in FIG. 6B. A reset element 604 is for allowing the user to reset a setting. In accordance with this element 604, the web browser 440 renders a reset button 612 in FIG. 6B. The web browser 440 renders a submit button 613 in FIG. 6B based upon a submit element 605 in FIG. 6A. If the submit button 613 is pressed by the user, then, in accordance with the description of start tag 601, the web browser 440 transmits this form data by the POST method in response to "./start". Furthermore, the fact that processing identical with processing executed owing to pressing of the submit button 613 is executable also by pressing the start key 303 on console unit 219 is described as a value attribute of the submit element 605. It should be noted that the web browser 440 displays a character string "START (START ALSO POSSIBLE USING START KEY)" as the submit button 613.

With reference again to FIG. 5, it is determined in step S5 based upon the analysis performed in step S3 whether a form submit element exists in the data received in step S2. If it is determined in step S5 that a submit element does not exist, then processing proceeds to step S6. Here control is exercised by the LED control section 444 in such a manner that the LED display 309 at the center of the start key 303 lights in the color red. As a result, the user is notified of the fact that an operation command using the start key 303 is not possible during display of this screen.

On the other hand, if the result of the determination in step S5 is that the data received in step S2 includes a submit element, then processing proceeds to step S7. For example, in a case where the data shown in FIG. 6A has been received, this data includes the submit element 605 and, hence, processing proceeds to step S7. In step S7, control is exercised by the LED control section 444 in such a manner that the LED display 309 at the center of the start key 303 lights in the color green. In this way the user is notified of the fact that an operation command using the start key 303 is possible during display of this screen. Next, at step S8, it is determined whether the submit button 613 in FIG. 6B has been pressed. Processing proceeds to step S10 if it is sensed that the submit button 613 has been pressed. On the other hand, if pressing of the submit button 613 is not sensed, then processing proceeds to step S9 and it is determined whether the start key 303 has been pressed. If pressing of the start key 303 is sensed, processing proceeds to step S10. Here processing for transmitting the form is executed in accordance with the description of the HTML file. Accordingly, processing for transmitting the form data by the POST method in response to "./start" is executed.

Thereafter, the form transmitted by the web browser 440 is received by the web application 410 of web server 102. Further, the web application 410 communicates with the service provider 450 of MFP 101 and controls the MFP 101 in such a manner that the document is read in at the designated resolution and transmitted by FTP.

Thus, in accordance with the first embodiment, as described above, when a submit element is included and the start key is usable, processing for submitting a form included in the content of an operation screen is executed automatically if the start key 303 on console unit 219 of the MFP 101 is pressed. As a result, on the basis of the submitted form data, the web application 410 of the web server 102 instructs the MFP 101 to start control such as document read or the like, by way of example. This makes it possible to provide excellent operability, namely the ability to instruct the start of processing by the start key 303 on console unit 219 of MFP 101 using the web application or a native application.

It should be noted that although the present invention is illustrated in a form in which the web application 410 instructs the service provider 450 of MFP 101 to perform control of reading a document by the MFP 101, the invention is not limited to this arrangement. For example, an arrangement may be adopted in which a script that describes processing to be executed by the MFP 101 is transmitted from the web application 410 of web server 102 to the web browser 440 of MFP 101 and the MFP 101 analyzes this script to thereby control the MFP 101.

A second embodiment of the present invention will be described next. The second embodiment will be described with regard to a case where the arrangement of the first embodiment is additionally provided with control for dealing with a situation where HTML data containing a plurality of submit elements is received. The system configuration and the configurations of the web server 102 and MFP 101 in the second embodiment are identical with those of the first embodiment and need not be described again.

Figure 7:
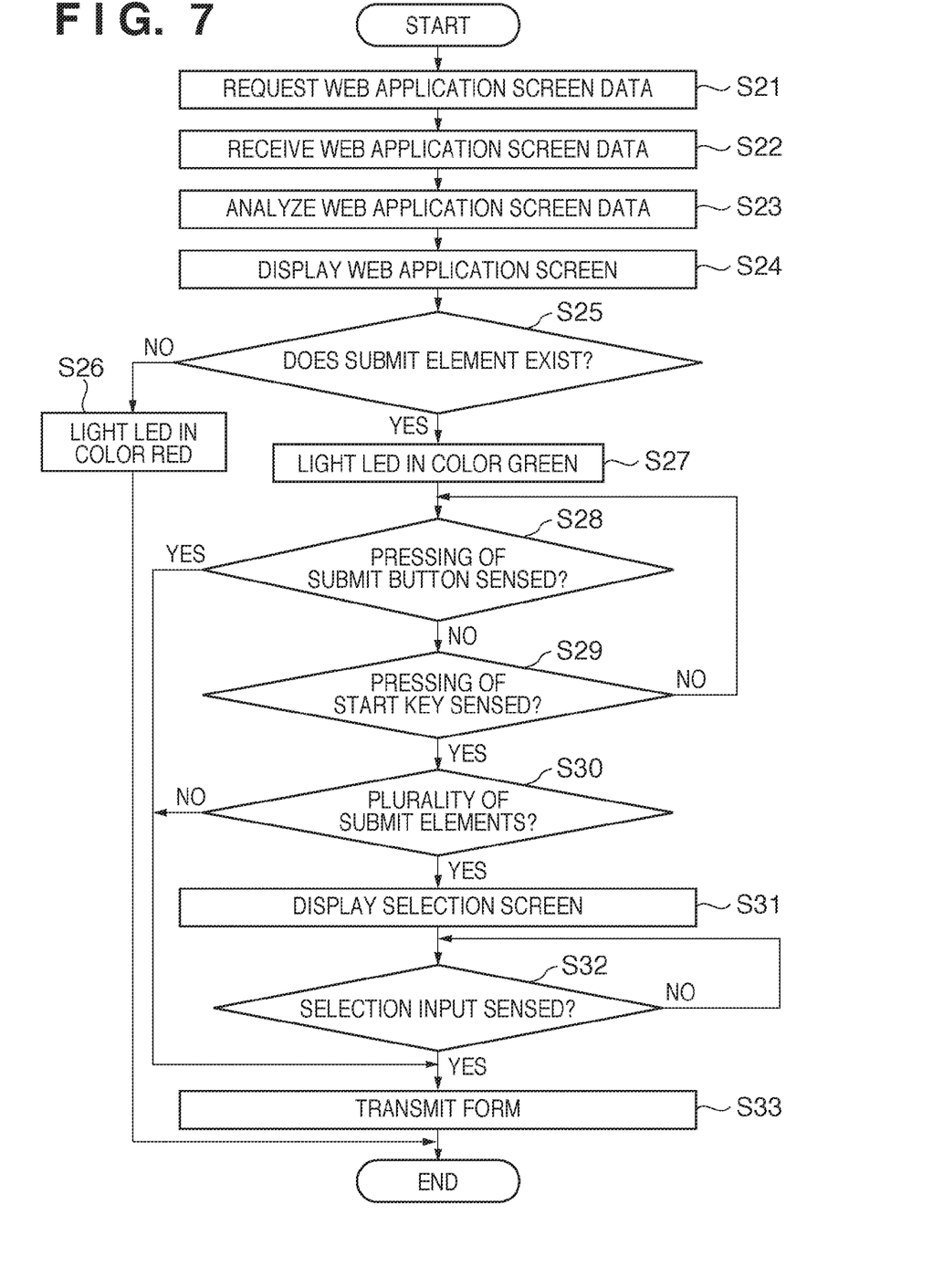
FIG. 7 is a flowchart for describing processing executed by an MFP according to a second embodiment of the present invention.

FIG. 7 is a flowchart for describing processing executed by the MFP 101 according to the second embodiment of the present invention. Here reference will be had to the flowchart to describe a series of operations performed by the web browser 440 in a case where the MFP 101 acquires and displays an operation screen from the web application 410, reads in a document in response to the user pressing the start key 303 and transmits the document to a specific FTP server. Each operation indicated in the flowchart is executed as a result of the CPU 211 of MFP 101 running a control program. Here the processing from step S21 to step S27 is similar to the processing from step S1 to step S7 in FIG. 5 and need not be described again.

In step S28, it is determined whether a submit button (811 or 812 in FIG. 8B) has been pressed. If pressing of a submit button is sensed, processing proceeds to step S33 and processing for transmitting a form corresponding to the submit button whose pressing has been sensed is executed. On the other hand, if pressing of a submit button is not sensed, then processing proceeds to step S29. Here it is determined whether the start key 303 on console unit 219 has been pressed. If pressing of the start key 303 is sensed in step S29, then processing proceeds to step S30. Here it is determined whether the data received in step S21 includes a plurality of submit elements. If it is determined in step S30 that only one submit element exists, then processing proceeds to step S33. If it is determined in step S30 that a plurality of submit elements exist, then processing proceeds to step S31. In step S31 ("DISPLAY SELECTION SCREEN"), a screen is displayed which makes it possible for the user to select for which of the plurality of submit elements.

Figure 8A:
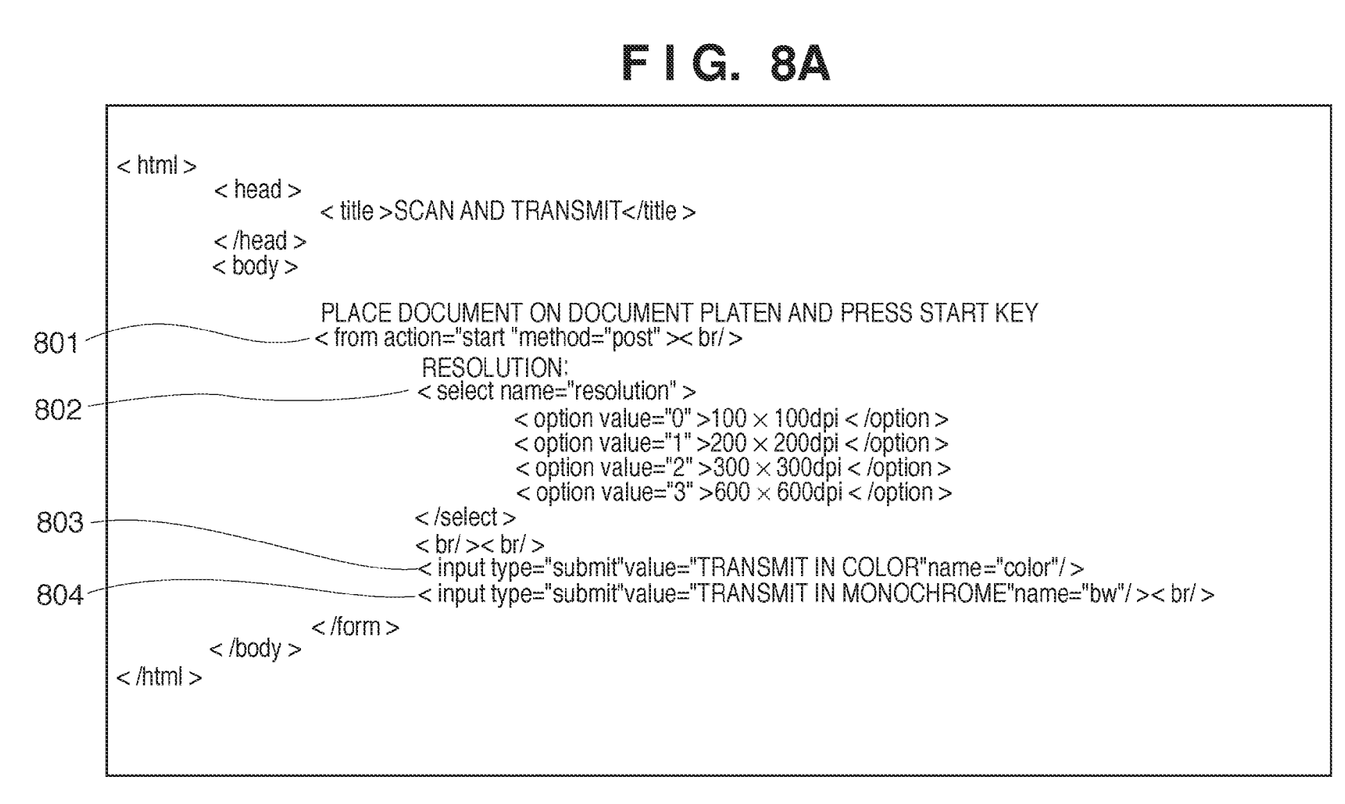
FIG. 8A is a diagram illustrating an example of application screen data that includes a plurality of submit elements.
Figure 8B:
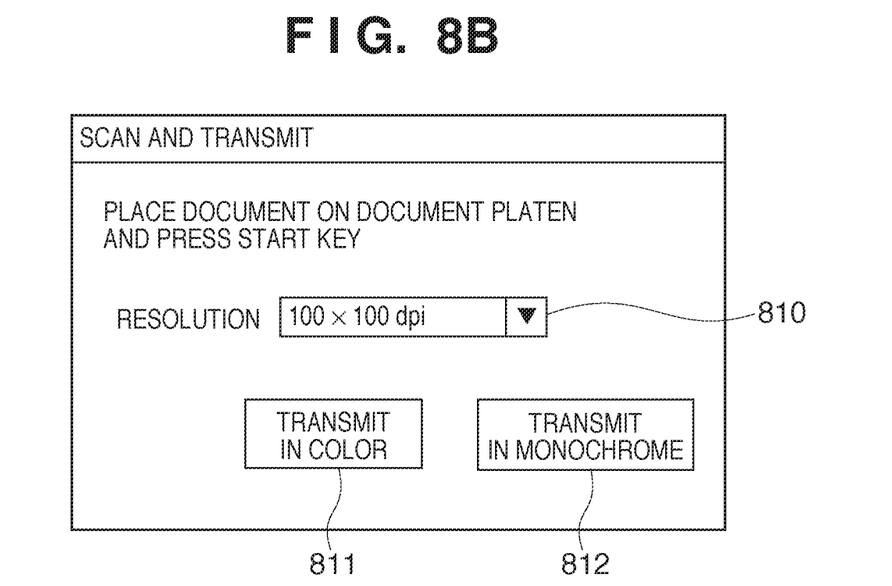
FIG. 8B is a diagram illustrating an example of a screen displayed on a display unit in a case where the screen data shown in FIG. 8A has been received.

FIG. 8A is a diagram illustrating an example of application screen data that includes a plurality of submit elements, and FIG. 8B is a diagram illustrating an example of a screen displayed on the display unit 301 in a case where the screen data shown in FIG. 8A has been received.

In FIG. 8A, a start tag 801 of a form indicates that the form is to be transmitted by the POST method in response to "./start" in a case where a submit command is issued by an action attribute and a method attribute. A select element 802 is for designating resolution. On the basis of the select element, the web browser 440 renders a pull-down menu of the kind shown at 810 in FIG. 8B. On the basis of a first submit element 803, the web browser 440 renders a first submit button of the kind shown at 811 in FIG. 8B. On the basis of a second submit element 804, the web browser 440 renders a second submit button of the kind shown at 812 in FIG. 8B.

Figure 9:
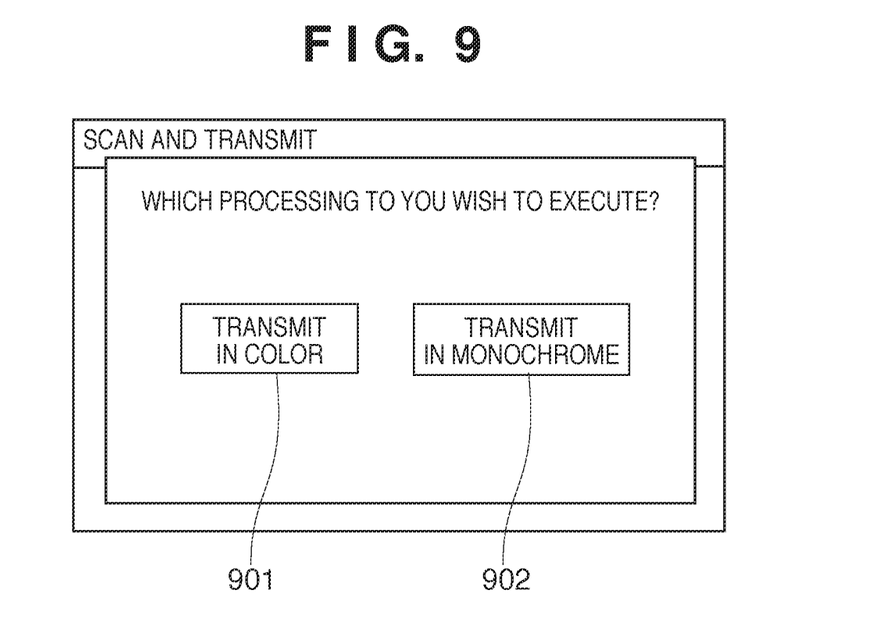
FIG. 9 is a diagram illustrating an example of a selection screen displayed in step S31 in FIG. 7.

FIG. 9 is a diagram illustrating an example of a selection screen displayed in step S31 in FIG. 7.

A button 901 corresponding to the first submit element and a button 902 corresponding to the second submit element are displayed so as to be selectable by the user.

With reference again to the flowchart of FIG. 7, whether the user has input a selection is sensed in step S32. Processing proceeds to step S33 if a selection input is sensed. Specifically, whether the button 901 or 902 in FIG. 9 has been pressed is sensed. If either button 901 or 902 is sensed to have been pressed, processing proceeds to step S33. Here transmit processing corresponding to the selected button is executed.

Thereafter, the form that has been transmitted by the web browser 440 is received by the web application 410. Based upon the contents of the form received, the web application 410 determines which submit processing has been executed. The web application 410 communicates with the service provider 450 and controls the MFP 101 in such a manner that the document is read in color or monochrome and transmitted by FTP.

Thus, in accordance with the second embodiment, as described above, if, when the start key of MFP 101 is pressed, a plurality of submit elements exist, a screen that makes it possible to select which submit element is to be processed is displayed. This makes it possible to provide excellent operability, namely the ability to instruct the start of processing by the start key even with an application in which a plurality of submit elements exist.

It should be noted that it may be so arranged that which submit element is to be processed when the start key is pressed is written in content as an attribute of the submit element beforehand, and submit processing is executed in accordance with this description when the start key is pressed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285743, filed Dec. 16, 2009, which is hereby incorporated by reference herein in its entirety.

What is claimed is:

1. An image processing apparatus capable of communicating with a web server, the apparatus comprising:
   an operation unit having (i) a hardware start key for instructing operation to start a scanning process and (ii) a display unit;
   a scanning unit configured to execute the scanning process of an original document in response to a detection of depression of the hardware start key;
   a display control unit configured, on the basis of data transmitted from the web server, to control the display unit to display a web page containing (i) a scan setting item and (ii) a transmitting item, the scan setting item being an item for inputting a scan setting and the transmitting item being associated with the hardware start key;
   a transmitting unit configured to transmit scan setting information to the web server when the hardware start key is operated while the web page containing the transmitting item is being displayed on the display unit, as well as when the transmitting item is operated on the web page, the scan setting information indicating the scan setting inputted by a user via the scan setting item; and
   a reception unit configured to receive an instruction from the web server, the instruction instructing an execution of the scanning process of an original document and being based on the scan setting information transmitted by the transmitting unit,
   wherein the scanning unit is configured to execute the scanning process in accordance with the instruction received by the reception unit.

2. The apparatus according to claim 1, further comprising a notification unit configured to notify a user that an input using the hardware start key is possible when the data transmitted from the web server includes a submit element.

3. The apparatus according to claim 2, wherein the notification unit has a light emission unit, and the notification unit causes the light emission unit to emit light when the data transmitted from the web server includes the submit element.

4. The apparatus according to claim 3, wherein the light emission unit is provided with the hardware start key.

5. The apparatus according to claim 1, further comprising:
   a reception unit configured to receive an instruction from the web server, the instruction instructing an execution of the scan process and being based on the scan setting information transmitted by the transmitting unit,
   wherein the scanning unit is configured to execute the scanning process in accordance with the instruction received by the reception unit.

6. The apparatus according to claim 1, wherein the data transmitted from the web server includes a plurality of submit elements and the data includes a description indicating which submit element is to be processed when the hardware start key is depressed, the transmitting unit transmitting the scan setting information in accordance with the description when the hardware start key is depressed.

7. The apparatus according to claim 5, further comprising a transmission unit configured to transmit image data obtained by the scanning process to a server that is different from the web server.

8. A method of controlling an image processing apparatus capable of communicating with a web server and having an operation unit that includes (i) a hardware start key for instructing operation to start a scanning process and (ii) a display unit, the method comprising:
   executing the scanning process of an original document in response to a detection of depression of the hardware start key;
   controlling the display unit to display a web page containing (i) a scan setting item and (ii) a transmitting item, the scan setting item being an item for including scan setting and the transmitting item being associated with the hardware start key, on a basis of data transmitted from the web server;

transmitting scan setting information to the web server when the hardware start key is operated while the web page containing the transmitting item is being displayed on the display unit, as well as when the transmitting item is operated on the web page, the scan setting information indicating the scan setting inputted by a user via the scan setting item; and receiving an instruction from the web server, the instruction instructing an execution of the scanning process of an original document and being based on the scan setting information transmitted in the transmitting step, wherein at least one of the executing, the controlling, the transmitting, and the receiving steps are executed by a central processor of the image processing apparatus.

9. A non-transitory computer-readable storage medium storing an executable program for causing a computer to execute the method defined by claim 8.

* * * * *